US012635620B2

(12) United States Patent
Beretta et al.

(10) Patent No.: US 12,635,620 B2
(45) Date of Patent: May 26, 2026

(54) RETICULAR STRUCTURE AND PROCESS FOR MAKING THE SAME

(71) Applicant: TENAX S.p.A., Viganò (IT)

(72) Inventors: Cesare Beretta, Castagnola (CH); Stefano Enrico Usuelli, Lecco (IT)

(73) Assignee: TENAX S.P.A., Vigano (IT)

(*) Notice: Subject to any disclaimer, the term of this patent is extended or adjusted under 35 U.S.C. 154(b) by 321 days.

(21) Appl. No.: 18/561,677

(22) PCT Filed: May 11, 2022

(86) PCT No.: PCT/IB2022/054365
§ 371 (c)(1),
(2) Date: Nov. 16, 2023

(87) PCT Pub. No.: WO2022/243798
PCT Pub. Date: Nov. 24, 2022

(65) Prior Publication Data

US 2024/0237592 A1 Jul. 18, 2024

(30) Foreign Application Priority Data

May 17, 2021 (IT) ........................ 102021000012683

(51) Int. Cl.
*A01G 13/32* (2025.01)
*A01G 20/10* (2018.01)

(52) U.S. Cl.
CPC ............. *A01G 13/32* (2025.01); *A01G 20/10* (2018.02)

(58) Field of Classification Search
CPC ........ A01G 13/30; A01G 13/31; A01G 13/32; A01G 20/10
See application file for complete search history.

(56) References Cited

U.S. PATENT DOCUMENTS

| | | | | |
|---|---|---|---|---|
| 2,601,620 A * | 6/1952 | Marshall | A01C 1/04 53/550 |
| 3,386,876 A | 6/1968 | Wyckoff | |
| 3,863,388 A * | 2/1975 | Loads | A01G 20/00 47/56 |
| 4,181,450 A * | 1/1980 | Rasen | E02B 3/126 428/116 |
| 4,662,946 A | 5/1987 | Mercer | |

(Continued)

FOREIGN PATENT DOCUMENTS

| | | | | |
|---|---|---|---|---|
| CN | 107322957 A * | 11/2017 | A01G 13/32 |
| FR | 2521065 A1 * | 8/1983 | B29C 48/05 |

(Continued)

OTHER PUBLICATIONS

Google translation of CN 107322957A (Year: 2017).*

(Continued)

*Primary Examiner* — Monica L Perry
*Assistant Examiner* — Aaron M Rodziwicz
(74) *Attorney, Agent, or Firm* — Nixon & Vanderhye P.C.

(57) ABSTRACT

Reticular structure made of material including: a biodegradable polymeric composition in a percentage by weight greater than 90% with respect to the total weight of the material of the reticular structure and a stabilizing additive configured, in use, for reducing the degradation of the reticular structure. A process for making said reticular structure and to a use thereof.

20 Claims, 6 Drawing Sheets

(56) References Cited

U.S. PATENT DOCUMENTS

| | | | | |
|---|---|---|---|---|
| 4,934,094 | A * | 6/1990 | Walton | A01G 20/10 47/9 |
| 5,419,659 | A | 5/1995 | Mercer | |
| 5,753,337 | A | 5/1998 | Slocumb | |
| 6,423,394 | B1 | 7/2002 | Mercer et al. | |
| 7,407,699 | B2 | 8/2008 | Jacoby | |
| 10,687,483 | B1 * | 6/2020 | Pothen | A01G 20/10 |
| 11,134,621 | B1 * | 10/2021 | Pothen | A01G 20/20 |
| 11,690,329 | B1 * | 7/2023 | Pothen | D03D 15/217 47/31 |
| 2004/0062615 | A1 | 4/2004 | Walsh | |
| 2004/0234725 | A1 * | 11/2004 | Chiang | E02D 17/202 442/205 |
| 2005/0050793 | A1 * | 3/2005 | Johnson | A01G 13/32 47/9 |
| 2005/0183329 | A1 | 8/2005 | Cederblad et al. | |
| 2008/0134574 | A1 * | 6/2008 | Zimmer | A01G 13/31 47/31 |
| 2013/0029072 | A1 * | 1/2013 | Camps | B29C 48/13 428/36.1 |

FOREIGN PATENT DOCUMENTS

| | | | | |
|---|---|---|---|---|
| GB | 922611 | A * | 4/1963 | B29C 48/08 |
| JP | H1135072 | A | 2/1999 | |
| JP | 2004010135 | A | 1/2004 | |
| JP | 2012030547 | A | 2/2012 | |
| KR | 20100063881 | A * | 6/2010 | E02D 17/20 |
| WO | WO-2010026227 | A1 * | 3/2010 | A01G 13/32 |
| WO | 2020252233 | A1 | 12/2020 | |

OTHER PUBLICATIONS

International Search Report for PCT/IB2022/054365, mailed Aug. 16, 2022, 5 pages.

Written Opinion of the ISA for PCT/IB2022/054365, mailed Aug. 16, 2022, 7 pages.

* cited by examiner

RETICULAR STRUCTURE AND PROCESS FOR MAKING THE SAME

RELATED APPLICATIONS

This application is the U.S. national phase of International Application No. PCT/IB2022/054365 filed May 11, 2022, which designated the U.S. and claims priority to IT 102021000012683 filed May 17, 2021, the entire contents of each of which are hereby incorporated by reference.

FIELD OF THE INVENTION

The present invention concerns a reticular structure made at least in part of biodegradable material, which can be used for the consolidation and/or stabilization of the soil. The reticular structure can be used for the construction and consolidation of grass clods and turf, which can be used for football fields, golf courses, road surfaces and parking areas. Furthermore, the reticular structure can be used for the protection and packaging of plants, for the packaging of perishable materials (fruit, vegetables), the production of anti-erosion mats, nets for floriculture. The present invention also relates to a process for making said reticular structure and to a use thereof.

Background Art

In the geotechnical industry, mono-oriented or bi-oriented nets made with high-density polymers are now used for reinforcement, containment and/or consolidation of the soil. Such nets are for example described in the following patents: U.S. Pat. No. 5,419,659A, US2004062615A1, 3,386,876, 7,407,699B2, 6,423,394B1. Alternatively, known nets can be made by extruding a monolithic grid as described for example in patent applications U.S. Pat. Nos. 4,662,946A and 5,753,337A.

The aforementioned nets are chemically inert and have an excellent tensile strength in the direction of the stretched elements. However, although the aforementioned nets are widely used, the Applicant has found that these nets are configured to keep their chemical nature unchanged over time with a consequent negative environmental impact: the materials used are in fact considered pollutants. Furthermore, such nets are not suitable for some uses, such as for example the production of grass clods or rolls for ready-made lawns. It has in fact been found that the non-biodegradability of known nets hinders the cutting of the grass clod and the subsequent step of collecting the grass clod or roll, causing it to break.

Nets of biodegradable material were therefore developed capable of consolidating the soil for a predetermined period of time before changing its chemical nature and being absorbed by the soil. In particular, nets made of polylactic acid (PLA), mixtures of polybutylene succinate (PBS) and polylactic acid (PLA) are known. For example, patent application WO 2020/252233 A1 describes nets for the cultivation of grass clods made by means of a mixture of PBS, PLA and a degrading additive. The Applicant has however found that also the nets described in the patent application WO 2020/252233 A1 can be improved in some respects. Such nets are in fact difficult to process and furthermore require the addition of expensive additives which favor the degradation of the net. The difficulty of processability and the addition of additives make known biodegradable nets expensive and not very controllable in the degradation process.

Nets of biodegradable material are also known, described in patent applications JP H11 35072 A, US 2005/183329 A1 and JP 2004 010135 A. JP H11 35072 A describes a biodegradable net used as a protective element for fruit. The net is made of foam material with shock-absorbing properties. US 2005/183329 A1 describes a single-stretch net of biodegradable material made of polylactic acid, in a variable percentage of between 5% and 95%, and biodegradable plasticizer, in a variable percentage of between 5% and 95%. JP 2004 010135 A also describes a biodegradable net used as a protective element for fruit; the net may be made of biodegradable material, for example PBS or PBSA, and an accelerator for the biodegradation of the net. The Applicant has found that also the nets described in patent applications JP H11 35072 A, US 2005/183329 A1 and JP 2004 010135 A can be improved in some aspects.

Object of the Invention

The object of the present invention therefore is to substantially solve the drawbacks and/or limitations of the above prior art.

An object of the present invention is to provide a reticular structure having a high mechanical strength suitable for correctly consolidating the soil but which at the same time is biodegradable; in particular, the object of the present invention is to provide a reticular structure which can effectively consolidate the soil for a predetermined period of time and which can correctly degrade after said period so as to be biodegradable. The object of the present invention is also to provide an easily processable reticular structure with low production costs.

SUMMARY

In one aspect, a monolithic reticular structure (2) is provided, said reticular structure (2) comprising:

- a plurality of first elements (3) distanced from one another and having an elongated conformation according to a first trajectory (T1),
- a plurality of second elements (4) distanced from one another and having an elongated conformation according to a second trajectory (T2) transversal, optionally orthogonal, to the first trajectory (T1), wherein said first and second elements (3, 4) intersect at nodes (5) to form meshes (6).

In one aspect according to the preceding aspect, the reticular structure (2) is used to perform at least one of: soil consolidation, soil reinforcement, protection of plants in the growth phase, packaging of plants, packaging of fruit, packaging of vegetables, construction of anti-erosive mats, construction of nets for floriculture.

In one aspect according to any one of the preceding aspects, the reticular structure (2) is made at least in part of biodegradable material. In one aspect according to any one of the preceding aspects, the reticular structure (2) is made (optionally entirely) of a material comprising:

- a biodegradable polymeric composition in a percentage by weight higher than 90% with respect to the total weight of the material of the reticular structure;
- a stabilizing additive configured to delay the degradation of the reticular structure (2) over time.

In one aspect according to any one of the preceding aspects, the stabilizing additive is configured, in conditions of use of the reticular structure, for delaying the degradation of the reticular structure (2) over time. In one aspect according to any one of the preceding aspects, the reticular structure (2), in use, is configured for performing at least one of: soil consolidation, soil reinforcement, protection of plants in the growth phase, packaging of plants, packaging of fruit, packaging of vegetables, construction of anti-erosive mats, construction of nets for floriculture.

In one aspect according to the preceding aspect, said material of the reticular structure (2) comprises a percentage by weight of said biodegradable polymeric composition comprised between 92% and 99.5%, optionally between 95% and 99%, with respect to total weight of said material.

In one aspect according to the two preceding aspects, the biodegradable polymeric composition comprises polybutylene succinate. In one aspect according to the three preceding aspects, the biodegradable polymeric composition of the material of the reticular structure (2) consists solely of polybutylene succinate.

In one aspect according to the four preceding aspects, said material of the reticular structure (2) comprises a percentage by weight of stabilizing additive comprised between 0.8% and 6%, optionally comprised between 1% and 3% with respect to the total weight of said material.

In one aspect according to any one of the preceding aspects, said material of the reticular structure (2) comprising:

- polybutylene succinate in a percentage by weight substantially equal to 98.5% with respect to the total weight of the material of the reticular structure;
- the stabilizing additive, how much is missing to reach 100%, optionally the stabilizing additive is substantially equal to 1.5% by weight, with respect to the total weight of the material of the reticular structure.

In one aspect according to any one of the preceding aspects, the biodegradable polymer composition comprises at least one aliphatic polyester.

In one aspect according to any one of the preceding aspects, the reticular structure (2) is made at least in part by means of a polymeric resin. In one aspect according to any one of the preceding aspects, the reticular structure (2) is made at least in part of polybutylene succinate. In one aspect according to any one of the preceding aspects, the reticular structure (2) is made of a material comprising only polybutylene succinate as a polymeric composition. In one aspect according to the preceding aspect, said material of the reticular structure may comprise one or more additives, optionally comprising at least one selected from the group among:

- a stabilizing additive configured, optionally in a condition of use of the reticular structure (2), to delay the degradation thereof over time;
- an ultraviolet stabilizing additive;
- a coloring additive.

In one aspect according to any one of the preceding aspects, the stabilizing additive comprises a crosslinking agent. In one aspect according to any one of the preceding aspects, the stabilizing additive, optionally the crosslinking agent, comprises carbodiimide groups.

In one aspect according to the two preceding aspects, the crosslinking agent is an aliphatic and/or aromatic carbodiimide. In one aspect according to the three preceding aspects, the crosslinking agent is an aliphatic carbodiimide and/or aromatic oligomeric or polymeric.

In one aspect according to any one of the preceding aspects, said material with which the reticular structure (2) is made is biodegradable, wherein the biodegradability of said material is such that the value of the degradation parameter is lower than 20, optionally in the range between 1 and 10, even more optionally between 1, 2 and 5; the degradation parameter is identified and measured as defined in the description.

In one aspect according to the preceding aspect, said material is such that a test sample according to the ISO 527-3 standard is subjected to the biodegradation process defined by the ASTM G160-12 (2019) standard for a period longer than 2 months, optionally longer than 7 months, even more optionally comprised between 8 months and 15 months, maintains structural continuity along the entire extension of said test samples.

In one aspect according to the two preceding aspects, said material is such that a test sample according to the ISO 527-3 standard is subjected to the biodegradation process defined by the ASTM G160-12 (2019) standard for a period longer than 20 months, optionally longer than 16 months, does not maintain structural continuity throughout the extension of said test sample.

In one aspect according to any one of the preceding aspects, the first elements (3) are parallel to each other, optionally the trajectories (T1) of the first elements (3) are parallel to each other. In one aspect according to any one of the preceding aspects, the trajectories (T1) of the first elements (3) are straight.

In one aspect according to any one of the preceding aspects, the first elements (3) are stretched along their extension, wherein the stretching ratio of a first element (3) is defined as the ratio between a final length of the same first element once it the stretching has been carried out and the initial length of such first element before the stretching action. In one aspect according to any one of the preceding aspects, the first elements (3) have a stretching ratio higher than 1.5, optionally comprised between 2 and 8, more optionally between 2.5 and 4, the stretching ratio of the first elements (3) is defined as the ratio between a final length of the first elements after a stretching action of the same and an initial length of the first elements before stretching.

In one aspect according to any one of the preceding aspects, the first elements (3) have a substantially thread-like structure. In one aspect according to any one of the preceding aspects, said first elements (3) have a cross section, measured at a portion of the center line defined between two immediately consecutive nodes, with an area lower than 5 $mm^2$, optionally comprised between 0.1 $mm^2$ and 1.5 $mm^2$.

In one aspect according to any one of the preceding aspects, the second elements (4) are parallel to each other, optionally the second trajectories (T2) of the second elements are parallel to each other. In one aspect according to any one of the preceding aspects, the trajectories (T2) of the second elements (4) are straight.

In one aspect according to any one of the preceding aspects, the second elements (4) are stretched along their extension, wherein the stretching ratio of a second element (4) is defined as the ratio between a final length of the same second element (4) once the stretching has been carried out and the initial length of such second element before the stretching action.

In one aspect according to any one of the preceding aspects, the second elements (4) have a stretching ratio higher than 1.5, optionally comprised between 2 and 5, more optionally comprised between 2 and 4, the stretching ratio of the second elements (4) being defined as the ratio between a final length of the second elements after a stretching action of the same and an initial length of the second elements before stretching.

In one aspect according to any one of the preceding aspects, the second elements (4) have a substantially filiform structure. In one aspect according to any one of the preceding aspects, the second elements (4) have a cross section, measured at a portion of the center line defined between two immediately consecutive nodes, with an area lower than 5 $mm^2$, optionally comprised between 0.1 $mm^2$ and 1.5 $mm^2$.

In one aspect according to any one of the preceding aspects, the ratio between the distance between two first adjacent elements and the distance between two second adjacent elements is comprised between 0.5 and 2, optionally between 0.8 and 1.2.

In one aspect according to any one of the preceding aspects, the first elements (3) are substantially identical to the second elements. In one aspect according to any one of the preceding aspects, the first elements (3) are identical in shape to the second elements (4). In one aspect according to any one of the preceding aspects, the first elements are identical in size to the second elements.

In one aspect according to any one of the preceding aspects, the reticular structure (2) comprises meshes having a quadrilateral shape, optionally having a square or rectangular shape.

In one aspect according to any one of the preceding aspects, the first and second elements (3, 4) are obtained by stretching a semi-finished product with a reticular structure having first and second precursor elements intersecting at nodes to define meshes. In one aspect according to the preceding aspect, the semi-finished product with a reticular structure is obtained by:

an extrusion process, or extrusion of a solid sheet subsequently cut.

In one aspect according to the two preceding aspects, the semi-finished product with a reticular structure is obtained by means of an extrusion process with pulsating technology. In one aspect according to any one of the preceding aspects, the reticular structure (2) is made by means of an extrusion process with pulsating technology.

In one aspect according to any one of the preceding aspects, the first elements (3) and/or said second elements (4) have a solid cross section. In one aspect according to any one of the preceding aspects, the ratio between an area of a cross section of a first element (3), measured at an intermediate portion between two immediately consecutive nodes (5), and an area of a cross section of a second element (4), also measured at an intermediate portion between two immediately consecutive nodes (5), is between 0.5 and 2, optionally between 0.7 and 1.2. In one aspect according to any one of the preceding aspects, the reticular structure has a weight comprised between 10 $g/m^2$ and 25 $g/m^2$, optionally comprised between 12 $g/m^2$ and 18 $g/m^2$. In one aspect according to any one of the preceding aspects, the reticular structure (2) has a specific tensile strength, along the trajectory of the first and/or second elements (3, 4), equal to or greater than 0.5 kN/m, in particular between 0.7 kN/m and 10 kN/m, optionally between 0.7 kN/m and 3 kN/m; said specific tensile strength being measured with the method shown in the ASTM D7179 standard.

In one aspect, a process is provided for manufacturing a reticular structure (2) according to any one of the preceding aspects. In one aspect according to the preceding aspect, the process comprises a step of extrusion of biodegradable material to form the reticular structure (2) having said first and second elements (3, 4) of elongated shape and extending along respective transverse trajectories, optionally orthogonal, with respect to each other, the first and second elements (3, 4) intersecting at nodes (5) to form meshes (6).

In one aspect according to the two preceding aspects, the process comprises the sub-steps of:

- extruding a monolithic semi-finished product with a reticular structure having first and second precursor bodies of elongated shape and extending along respective transverse extension trajectories, optionally orthogonal, one with respect to the other, the first and second precursor bodies intersecting at nodes to form meshes,
- stretching the semi-finished product along the extension of the first and/or second precursor bodies so as to define a stretched reticular structure (2) defined by said first and second elements (3, 4).

In one aspect according to the preceding aspect, the process comprises a step of stretching the semi-finished product along the extension of the first and second precursor bodies so as to define said reticular structure (2) having said and first and second elements (3, 4) stretched along their extension, optionally to define a bi-stretched reticular structure (2). In one aspect according to any one of the preceding process aspects, the stretching step is executed along the extension of the first and second precursor bodies to define a bi-stretched reticular structure.

In one aspect according to any one of the preceding process aspects, the semi-finished product is obtained continuously by means of an extrusion process, optionally by means of pulsating technology. In one aspect according to any one of the preceding process aspects, the extrusion step comprises the following sub-steps:

- extruding said monolithic semi-finished product with reticular structure in cylindrical shape wherein the first precursor bodies extend along an extrusion direction while the second precursor bodies, each of which has a substantially circular shape, extend transversely, optionally orthogonally, to the first precursor bodies,
- moving said monolithic semi-finished product along a advancement direction (MD),
- cooling said monolithic semi-finished product,
- cutting said monolithic semi-finished product having a circular shape in advancement along the advancement direction (MD) so that the same semi-finished product can be opened and subsequently spread in a flat shape in which said first precursor bodies extend parallel to the advancement direction (MD) while said second precursor bodies extend transversely, optionally orthogonally, to said advancement direction (MD).

In one aspect according to the preceding aspect, the extrusion of the monolithic semi-finished product with a reticular structure is executed by means of a cylindrical extrusion head with pulsating technology.

In one aspect according to any one of the preceding process aspects, the monolithic semi-finished product with a reticular structure, open and spread out in a flat shape, has said first and second precursor bodies lying essentially on the same plane.

In one aspect according to the two preceding aspects, the stretching step is executed on the monolithic semi-finished product with a reticular structure following the cutting and stretching step thereof. In one aspect according to the two preceding aspects, the stretching step is carried out on the monolithic semi-finished product with a reticular structure when it is spread flat along at least one stretching direction.

In one aspect according to any one of the preceding process aspects, the stretching step is executed on the monolithic semi-finished product with a reticular structure following the cutting and stretching step thereof. In one aspect according to the two preceding aspects, the stretching step is executed on the monolithic semi-finished product with a reticular structure when it is spread flat along at least one stretching direction.

In one aspect according to any one of the preceding process aspects, the stretching step of the monolithic semi-finished product with a reticular structure is executed along at least one of the following directions:

- a stretching direction substantially parallel to the advancement direction (MD), optionally parallel to the extension trajectory of the first precursor bodies,
- a stretching direction substantially orthogonal to the advancement direction (MD), optionally parallel to the extension trajectory of the second precursor bodies.

In one aspect according to any one of the preceding process aspects, the stretching step of the monolithic semi-finished product with a reticular structure is executed along the extension trajectories of the first and second precursor bodies to define a reticular structure (2) with first and second elements (3, 4) stretched along their extension.

In one aspect according to any one of the preceding process aspects, the stretching ratio of each first element (3) is defined as the ratio between a final length of the first element itself once stretching has been executed and the initial length of such first element before the stretching action, i.e. the length of the first precursor body suitable for defining said first element (3). In one aspect according to any one of the preceding process aspects, the first elements (3) have a stretching ratio higher than 1.5, optionally comprised between 2 and 8, more optionally between 2.5 and 4.

In one aspect according to any one of the preceding process aspects, the stretching ratio of each second element (4) is defined as the ratio between a final length of the second element itself once the stretching has been carried out and the initial length of such second element before the stretching action, i.e. the length of the second precursor body adapted to define said second element (4). In one aspect according to any one of the preceding process aspects, the second elements (4) have a stretching ratio higher than 1.5, optionally between 2 and 5, more optionally between 2 and 4.

In one aspect according to any one of the preceding process aspects, the reticular structure (2) is made at least in part of biodegradable material. In one aspect according to any one of the preceding process aspects, the reticular structure (2) is made of a material comprising:

- a biodegradable polymeric composition in a percentage by weight higher than 90% with respect to the total weight of said composition;
- a stabilizing additive configured for reducing the degradation of the reticular structure (2).

In one aspect according to any one of the preceding process aspects, said material of the reticular structure comprises a percentage by weight of said biodegradable polymeric composition comprised between 92% and 99.5%, optionally between 95% and 99%, with respect to total weight of said material. In one aspect according to any one of the preceding process aspects, the biodegradable polymeric composition comprises polybutylene succinate. In one aspect according to any one of the preceding process aspects, the biodegradable polymeric composition of the material of the reticular structure consists solely of polybutylene succinate. In one aspect according to any one of the preceding process aspects, said material of the reticular structure (2) comprises a percentage by weight of stabilizing additive comprised between 0.8% and 6%, optionally comprised between 1% and 3% with respect to the total weight of said material. In one aspect according to any one of the preceding process aspects, the reticular structure (2) is made of a material comprising:

- polybutylene succinate in a percentage by weight substantially equal to 98.5% with respect to the total weight of said composition;
- the stabilizing additive, how much is missing to reach 100%, optionally a percentage by weight of stabilizing additive substantially equal to 1.5% with respect to the total weight of said material.

In one aspect according to any one of the preceding process aspects, the biodegradable polymer composition comprises at least one aliphatic polyester. In one aspect according to any one of the preceding process aspects, the reticular structure (2) is made at least in part by means of a polymeric resin. In one aspect according to any one of the preceding process aspects, the reticular structure (2) is made at least in part of polybutylene succinate. In one aspect according to any one of the preceding process aspects, the reticular structure (2) is made of a material comprising only polybutylene succinate as a polymeric composition. In one aspect according to any one of the preceding process aspects, said material of the reticular structure may comprise one or more additives, optionally comprising at least one selected from the group among:

- a stabilizing additive configured, in conditions of use of the reticular structure (2), for reducing the degradation of the reticular structure itself;
- an ultraviolet stabilizing additive;
- a coloring additive.

In one aspect according to any one of the preceding aspects, the stabilizing additive comprises a crosslinking agent. In one aspect according to any one of the preceding aspects, the stabilizing additive, optionally the crosslinking agent, comprises carbodiimide groups.

In one aspect according to the two preceding aspects, the crosslinking agent is an aliphatic and/or aromatic carbodiimide. In one aspect according to the three preceding aspects, the crosslinking agent is an aliphatic carbodiimide and/or aromatic oligomeric or polymeric carbodiimide.

In one aspect according to any one of the preceding process aspects, the extrusion step is executed at a temperature comprised between 110° C. and 180° C., optionally comprised between 150° C. and 175° C. In one aspect according to any one of the preceding process aspects, the stretching step is executed at a temperature comprised between 65° C. and 110° C. In one aspect according to any one of the preceding process aspects, the stretching step of the first precursor bodies is executed at a temperature comprised between 75° C. and 90° C. In one aspect according to any one of the preceding process aspects, the stretching step of the first precursor bodies is executed in a water bath. In one aspect according to any one of the preceding process aspects, the stretching step of the second precursor bodies is executed at a temperature comprised between 85° C. and 110° C. In one aspect according to any one of the preceding process aspects, the stretching step of the second precursor bodies is executed in air, optionally in a casing inside which there is air heated to a temperature comprised between 85° C. and 110° C. In one aspect according to any one of the preceding process aspects, the extrusion step is executed at a speed comprised between 5 meters/minute and 12 meters/minute, optionally comprised between 6 meters/minute and 10 meters/minute. In one aspect according to any one of the preceding process aspects, the stretching speed of the first precursor bodies defining said first stretched elements (3) is executed, along the advancement direction (MD), at a speed comprised between 23 meters/minute and 27 meters/minute. In one aspect according to any one of the preceding process aspects, the stretching speed of the second precursor bodies for defining said second stretched elements (4) is executed, along a direction orthogonal to the advancement direction (MD), at a speed comprised between 4 meters/minute and 30 meters/minute, optionally comprised between 8 meters/minute and 20 meters/minute.

In one aspect, a grass clod is provided comprising:

a soil layer, a predetermined amount of grass emerging from one side of the soil layer, at least one reticular structure (2) according to any one of the preceding aspects engaged to the soil layer.

In one aspect according to the preceding aspect, the reticular structure (2) is configured, in use, for consolidating at least the soil layer. In one aspect according to the two preceding aspect, the soil layer extends in thickness between a first and a second surface. In one aspect according to the preceding aspect, the thickness of the soil layer is greater than 0.5 cm, optionally it is comprised between 0.65 cm and 2.5 cm.

In one aspect according to the four preceding aspects, the grass clod has a surface extension greater than 0.25 $m^2$, optionally it is comprised between 0.25 $m^2$ and 1.5 $m^2$. In one aspect according to the five preceding aspects, the reticular structure is placed in the soil layer. In one aspect according to the six preceding aspects, the reticular structure is entirely immersed in the soil layer. In one aspect according to the seven preceding aspects, the reticular structure extends substantially parallel to the first and/or second surface of the soil layer.

In one aspect according to the eight preceding aspects, the reticular structure extends into the soil layer in interposition between the first and second surfaces of said soil layer.

In one aspect, a process is provided for making a grass clod according to any one of the preceding grass clod aspects. In one aspect according to the preceding aspect, the process comprises the following steps:

laying the reticular structure (2) on a soil portion, sowing the soil portion by laying grass seeds, following the growth of grass on the soil portion, cutting in the soil to delimit a grass clod.

In one aspect according to the preceding aspect, the process comprises a further step of collecting the grass clod following the cutting in the soil. In one aspect according to the two preceding aspects, the step of cutting the soil and collecting the grass clod is executed after a period comprised between 6 and 14 months starting from the step of sowing the soil portion.

In one aspect, a grass roll (R) is provided, wound around an axis and comprising:

a soil layer, a predetermined amount of grass emerging from one side of the soil layer, at least one reticular structure (2) according to any one of the preceding aspects engaged to the soil layer.

In one aspect according to the preceding aspect, the reticular structure (2) being configured, in use, to consolidate at least the soil layer.

In one aspect according to the two preceding aspects, the grass roll (R), completely unwound and arranged on a plane, has a length comprised between 1 meter and 40 meters; said length being measured along an unwinding direction of the same grass roll (R). In one aspect according to the three preceding aspects, the roll has a width greater than 0.6 meters, optionally comprised between 0.6 meters and 2 meters; said width being measured along the axis around which said roll of grass is wound.

In one aspect according to the four preceding aspects, the grass roll (R), completely unwound and arranged on a plane, has a surface extension greater than 0.6 $m^2$, optionally it is comprised between 1 $m^2$ and 1.5 $m^2$. In one aspect according to any one of the preceding roll aspects, the soil layer extends in thickness between a first and a second surface. In one aspect according to any one of the preceding roll aspects, the thickness of the soil layer is greater than 0.5 cm, optionally it is comprised between 0.65 cm and 2.5 cm. In one aspect according to any one of the preceding roll aspects, the reticular structure (2) is entirely immersed in the soil layer. In one aspect according to any one of the preceding roll aspects, the reticular structure extends substantially parallel to the first and/or second surface of the soil layer. In one aspect according to any one of the preceding roll aspects, the reticular structure extends in interposition between the first and second surfaces of the soil layer.

In one aspect, a process is provided for making a grass roll according to any one of the preceding grass roll aspects. In one aspect according to the preceding aspect, the process comprises the following steps:

laying the reticular structure (2) on a soil portion, sowing the soil portion by laying grass seeds, following the growth of grass on the soil portion, making a cut in the soil to delimit an elongated grass clod along an extension direction, collecting the elongated grass clod by means of a rolling action of the clod around an axis orthogonal to the extension direction to define said grass roll.

In one aspect according to the preceding aspect, the step of cutting the soil and collecting the grass clod is executed after a period comprised between 6 months and 14 months starting from the step of sowing the soil portion.

In a further aspect, a use of the reticular structure (2) is provided according to any one of the preceding aspects for at least one of: soil consolidation, soil reinforcement, protection of plants in the growth phase, packaging of plants, packaging of fruit, packaging of vegetables, construction of anti-erosive mats, construction of nets for floriculture.

In one aspect, a granular compound is provided, optionally made by means of a compounding process, made of a material comprising:

a biodegradable polymeric composition in a percentage by weight higher than 90% with respect to the total weight of the granular compound;

a stabilizing additive configured for delaying the degradation of the granular compound over time.

In one aspect according to any one of the preceding aspects, the stabilizing additive is configured, in use, for delaying the degradation of the granular compound over time. In one aspect according to the preceding aspect, said material of the granular compound comprises a percentage by weight of said biodegradable polymeric composition comprised between 92% and 99.5%, optionally between 95% and 99%, with respect to total weight of said material. In one aspect according to the two preceding aspects, the biodegradable polymeric composition comprises polybutylene succinate. In one aspect according to the three preceding aspects, the biodegradable polymeric composition of the material of the granular compound consists solely of polybutylene succinate. In one aspect according to the four preceding aspects, said material of the granular compound comprises a percentage by weight of stabilizing additive comprised between 0.8% and 6%, optionally comprised between 1% and 3% with respect to the total weight of said material. In one aspect according to any one of the preceding aspects, said material of the granular compound comprising:

polybutylene succinate in a percentage by weight substantially equal to 98.5% with respect to the total weight of the material of the granular compound;

the stabilizing additive, how much is missing to reach 100%, optionally the stabilizing additive is substantially equal to 1.5% by weight, with respect to the total weight of the material of the granular compound.

In one aspect according to any one of the preceding aspects, the biodegradable polymer composition comprises at least one aliphatic polyester.

In one aspect according to any one of the preceding aspects, the granular compound is made at least in part by means of a polymeric resin. In one aspect according to any one of the preceding aspects, the granular compound is made at least in part of polybutylene succinate. In one aspect according to any one of the preceding aspects, the granular compound is made of a material comprising only polybutylene succinate as a polymeric composition. In one aspect according to the preceding aspect, said material of the granular compound may comprise one or more additives, optionally comprising at least one selected from the group among:

a stabilizing additive configured for delaying the degradation of the granular compound over time;

an ultraviolet stabilizing additive;

a coloring additive.

In one aspect according to any one of the preceding aspects, the stabilizing additive comprises a crosslinking agent. In one aspect according to any one of the preceding aspects, the stabilizing additive, optionally the crosslinking agent, comprises carbodiimide groups.

In one aspect according to the two preceding aspects, the crosslinking agent is an aliphatic and/or aromatic carbodiimide. In one aspect according to the three preceding aspects, the crosslinking agent is an aliphatic carbodiimide and/or aromatic oligomeric or polymeric.

In one aspect according to any one of the preceding aspects, the granular compound is obtained by a compounding process.

BRIEF DESCRIPTION OF THE DRAWINGS

Some embodiments and some aspects of the invention are described hereinafter with reference to the accompanying drawings, provided only for illustrative and, therefore, non-limiting purposes, wherein.

DEFINITIONS

Figure 1:
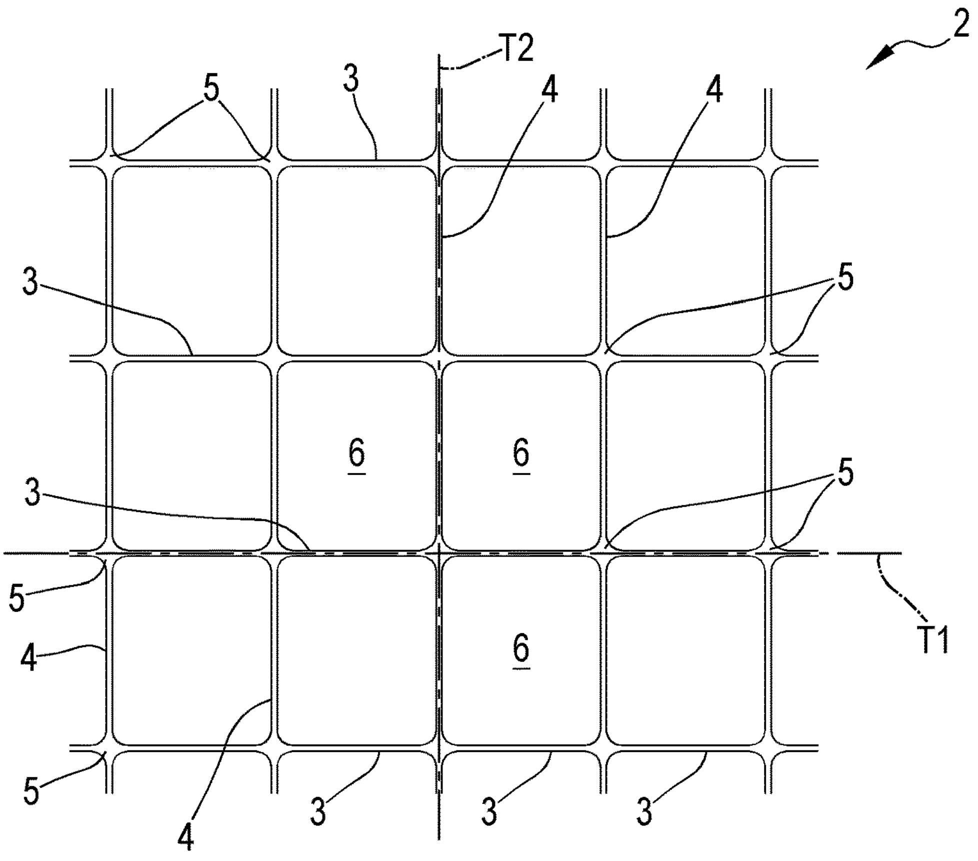
FIG. 1 shows a reticular structure according to the present invention.
Figure 2:
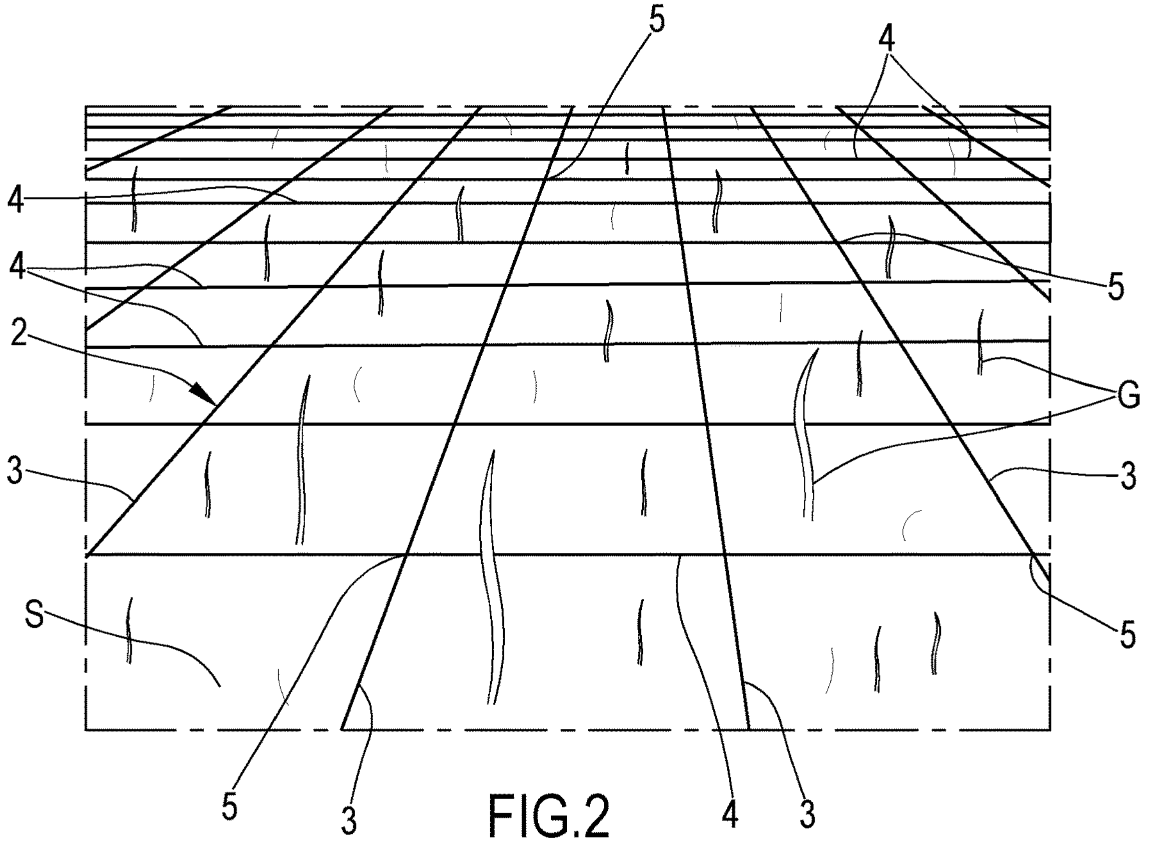
FIG. 2 shows a possible application on the ground of a reticular structure according to the present invention.

It should be noted that in the present detailed description, corresponding parts illustrated in the various figures are indicated by the same reference numerals. The figures may illustrate the object of the invention by representations that are not in scale; therefore, parts and components illustrated in the figures relating to the object of the invention may relate solely to schematic representations.

In the following description and in the claims, the term "advancement direction" (MD) refers to a direction of movement of a starting semi-finished product formed by an extrusion station and which proceeds along an advancement path through a cooling station, optionally a stretching station and then up to a collection station. The advancement direction, in the technical sector, is also called "machine direction".

The term "biodegradable" means a material (of natural or synthetic origin) capable of degrading over time, optionally through enzymatic processes, for example by the action of bacteria, fungi or by interaction with other microorganisms.

The term "stretched" in relation to first and/or second elements (3, 4) of the reticular structure (2) object of the present invention means a process which allows said elements to be lengthened so as to arrange the molecular chains that form the latter (said first and/or second elements 3, 4) according to an orientation markedly oriented along an extension trajectory of the elements themselves. Depending on the stretching degree, the elements can have a more or less thin structure, being able to assume a substantially threadlike conformation. As will be better described below, the stretching is carried out starting from a monolithic semi-finished product with a reticular structure having first precursor bodies substantially spaced from each other intersected with second precursor bodies also substantially spaced from each other: the first and second precursor bodies essentially form a square or rectangular mesh net in which at least the first precursor bodies can, in a non-limiting manner, extend parallel to the extrusion direction. The stretching ratio is also defined as the ratio of a stretched element and the length of the relative precursor body suitable for defining, following the stretching action, said stretched element. In detail, the stretching ratio of the first elements is defined as the ratio between a final length of the first elements after a stretching action thereof and an initial length of the first elements before stretching; the stretching ratio of the second elements is defined as the ratio between a final length of the second elements after a stretching action thereof and an initial length of the second elements before stretching.

The term "compounding" means a process which allows preparing a composition by mixing solutions and additives in the molten state to obtain a solid compound in granular form made with said composition and therefore having predetermined features. The granular solid compound is then used in an extrusion process to create reticular structures, for example nets.

The reticular structure object of the present invention is made by means of an extrusion process using a solid compound in granular form whose composition is obtained by mixing, inside a feeder, a predetermined amount of polybutylene succinate (PBS), optionally added with a stabilizing additive; once the composition has been correctly mixed to obtain a uniform composition, it is sent to an extruder. The extruder by means of a worm screw is configured for compressing the material and guide it out through a die from which the composition comes out in the form of long threads; the threads are then cooled in a water bath, or by spraying. The cooled threads are then sent, for example by means of a conveyor belt, to a granulator configured for breaking the threads into the desired dimensions to generate the solid compound in granular form (also called "compound").

Definition and Measurement of the Degradation Parameter

A first test sample, made of said material and which has not undergone any biodegradation (and which is therefore perfectly intact), is subjected to breakage tests and the relative percentage elongation at break $\Delta R_1$ of such first test sample is measured according to the method set out in the ISO 527-3 standard. A second test samples, identical to the first test samples, is subjected to the biodegradation process defined by the ASTM G160-12(2019) standard for a period of 7 months. At the end of this period, the second test sample is subjected to breaking tests and the relative percentage elongation at break $\Delta R_2$ of this second test sample is measured according to the method set out in the ISO 527-3 standard.

The value of the degradation parameter is then defined as a ratio $\Delta R_1/\Delta R_2$ between the percentage elongation at break $\Delta R_1$ of the first test sample as measured above and the percentage elongation at break $\Delta R_2$ of the second test sample (measured after said biodegradation of 7 months).

As mentioned above, the degradation process is based on the method set out in the ASTM G160-12(2019) standard. The process involves the use of dumbbell-shaped samples, cut from sheets. Such samples are exposed to the soil under laboratory-controlled conditions. The soil is inoculated with 2% (based on dry weight) of fresh compost or alternatively obtained from an industrial composting plant that treats the organic fraction of municipal solid waste. The containers (40×16×18 cm) used to contain the underground samples were incubated at constant temperature (25±2° C.) and relative humidity (90±5%). The soil moisture content was kept constant (at 80% of water holding capacity) by spraying demineralized water to correct any evaporation during incubation. The samples were recovered from the soil at regular intervals, for this purpose 6 replicate samples were used to collect a certain amount of data.

DETAILED DESCRIPTION

Reticular Structure

Reference numeral 2 indicates a reticular structure which can be used for consolidation or to promote soil compaction. The reticular structure 2 can also be used for the protection of plants in the growth phase, the packaging of plants, the packaging of perishable materials (fruit, vegetables), the production of anti-erosive mats, nets for floriculture. More generally, the reticular structure 2 finds application for uses in which the presence of the reticular structure 2 is required—for example for consolidation and/or protection and/or reinforcement purposes—for a predetermined period of time and in which it is preferable that there is a biodegradation of the same following the "useful" period of the reticular structure 2. By useful period it is meant the time period during which it is necessary that the reticular structure is substantially intact and suitable for correctly performing the required function, i.e. for purposes of consolidation and/or protection and/or for reinforcement.

As can be seen from FIG. 1, the reticular structure 2 comprises a plurality of first elements 3 spaced apart and parallel to each other; the first elements 3 are interconnected to a plurality of second elements 4 which are also spaced apart and parallel to each other: the plurality of second elements 4 are placed transversely, in particular orthogonally, to the first elements 3. In detail, each of the first elements 3 extends along the entire reticular structure 2 and is formed by a plurality of portions aligned along the same line. Similarly, each of said second elements 4 also extends along the entire reticular structure 2, transversely to the first elements 3, and is formed by a plurality of portions aligned along the same line: each of the first elements 3 is intersected by a plurality of second elements 4 and each of the second elements 4 is intersected by a plurality of first elements 3 at nodes 5 to form meshes 6. The reticular structure 2 defines a monolithic grid (net), i.e. in a single piece, consisting solely of said first and second elements 3, 4.

In detail, the first elements 3 have an elongated conformation according to a first trajectory T1 (FIG. 1). The trajectories T1 of the first 3 elements are parallel to each other. Said first trajectories can be straight so as to form first straight and elongated elements along parallel directions. The first elements 3 have, at least at a portion of the center line defined between two immediately consecutive nodes 5 and orthogonally to the first trajectory T1, a section having a substantially elliptical shape. The possibility of making first elements 3 having, at least at a portion of the center line defined between two immediately consecutive nodes 5 and orthogonally to the second trajectory, a section having for example a rectangular, square, circular or "T" shape, is not excluded. The first elements 3 have a substantially threadlike structure and therefore have a reduced cross section along their entire extension; for example, the first elements 3 may have a cross section, measured at a portion of the center line defined between two immediately consecutive nodes, with an area lower than 5 $mm^2$, optionally comprised between 0.1 $mm^2$ and 1.5 $mm^2$. The cross section remains substantially constant throughout the extension of the first element 3 with an increase in section at the nodes where the first element widens to join with said second elements 4.

The second elements 4 also have an elongated conformation according to a second trajectory T2. As can be seen in the accompanying figures, the trajectories T2 of the second elements 4 are parallel to each other. The second trajectories T2 can be straight so as to form first straight and elongated elements along parallel directions.

The second elements 4 have, at least at a portion of the center line defined between two immediately consecutive nodes 5 and orthogonally to the second trajectory T2, a section having a substantially elliptical shape. It is not excluded the possibility of making second elements 4 having, at least at a portion of the center line defined between two immediately consecutive nodes 5 and orthogonally to the second trajectory, a section having for example a rectangular, square, circular or "T" shape.

The first and second elements 3, 4 lie substantially on the same plane to substantially define a net with a flat conformation. The second elements 4 have a substantially threadlike structure and have a reduced cross section along their entire extension; for example, the second elements 4 may have a cross section, measured at a portion of the center line defined between two immediately consecutive nodes, with an area lower than 5 $mm^2$, optionally comprised between 0.1 $mm^2$ and 1.5 $mm^2$. The cross section may be constant throughout the extension of the second element 4 with an increase in section at the nodes 5 where the second element 4 widens to join with said first elements 3.

The ratio between the distance between two first adjacent elements 3 and the distance between two second adjacent elements 4 is comprised between 0.5 and 2, optionally between 0.8 and 1.2. The meshes 6 of the reticular structure 2 are substantially square. Obviously, the possibility of making meshes having a different shape, for example rectangular, triangular or rhomboidal, is not excluded. Quantitatively, the minimum distance between two first adjacent elements 3 is comprised between 4 mm and 200 mm, optionally between 10 mm and 50 mm. Likewise, the minimum distance between adjacent second elements 4 is comprised between 4 mm and 200 mm, optionally between 10 mm and 50 mm. As these distances vary, the dimensions of the meshes 6 vary and may have a through area comprised between 16 $mm^2$ and 40000 $mm^2$, optionally comprised between 200 $mm^2$ and 3000 $mm^2$.

The reticular structure 2 can be stretched at least along an extension direction of the first elements 3 and/or of the second elements 4 to define a mono-stretched and/or bi-stretched reticular structure 2; for example, the reticular structure 2 can be stretched along the extension of the first elements 3 only, i.e. along the first trajectory T1. The reticular structure 2 can be stretched along two directions, in particular along the extension of the first and second elements 3, 4 to define a bi-stretched reticular structure as illustrated for example in FIG. 1: in this configuration, the reticular structure is stretched both along the first trajectory T1 and along the second trajectory T2. The stretching ratio, i.e. the ratio between the length of the elements (first elements and/or second elements) after stretching and their length before stretching, is greater than 1.5. In detail, the first elements 3 are stretched along the first trajectory T1; the first elements 3 have a stretching ratio higher than 1.5, optionally comprised between 2 and 8, more optionally between 2.5 and 4.

The second elements 4 are stretched along the second trajectory T2; the second elements 4 have a stretching ratio higher than 1.5, optionally comprised between 2 and 5, more optionally between 2 and 4. The threadlike structure of the first and second elements 3, 4 is substantially defined by the stretching action which accentuates the elongation of said elements and thinning the cross section thereof.

The reticular structure 2 substantially has two extension directions (i.e. the directions in which the first element 3 and the second elements 4 extend): the structure 2 has an overall height, or thickness, orthogonal to such extension directions much smaller than the dimensions defined in the two extension directions (for example length and width of the reticular structure 2 to define a reticular structure 2 having a substantially uni-planar shape. The height of the reticular structure 2 is defined by the (maximum) height of the first and/or second elements 3, 4 or by the height defined at the nodes 5. The specific weight of the reticular structure 2 is comprised between 10 $g/m^2$ and 25 $g/m^2$ (optionally between 12 $g/m^2$ and 18 $g/m^2$).

The reticular structure has a specific tensile strength, along the first and/or second elements, equal to or greater than 0.5 kN/m, optionally comprised between 0.7 kN/m and 10 kN/m, even more optionally between 0.7 kN/m and 3 kN/m; the specific tensile strength is measured with the method set out in the ASTM D7179 standard.

The reticular structure 2 is made at least in part of biodegradable material. In particular, the reticular structure 2 is made of a material comprising:

- a biodegradable polymeric composition in a percentage by weight higher than 90% with respect to the total weight of the material of the reticular structure;
- a stabilizing additive configured, in use, for reducing the degradation of the reticular structure (2).

The reticular structure 2 may comprise a percentage by weight of said biodegradable polymeric composition comprised between 92% and 99.5%, optionally between 95% and 99%, with respect to total weight of the material of the reticular structure. The biodegradable polymer composition may comprise polybutylene succinate; in particular, the biodegradable polymeric composition of the material of the reticular structure 2 consists solely of polybutylene succinate (polymeric composition consisting of 100% polybutylene succinate).

The stabilizing additive may be comprised in a weight percentage comprised between 0.8% and 6%, optionally of between 1% and 3% with respect to the total weight of said material. The reticular structure 2 may be made of a material comprising:

- polybutylene succinate in a percentage by weight substantially comprised between 98% and 99%, optionally 98.5%, with respect to the total weight of the material of the reticular structure;
- the stabilizing additive, how much is missing to reach 100% by weight of the material of the reticular structure, optionally the stabilizing additive is substantially equal to 1.5% by weight, with respect to the total weight of the material of the reticular structure.

In detail, the stabilizing additive may comprise a crosslinking agent, for example selected from the group comprising carbodiimide groups. Crosslinking agents comprising carbodiimide groups have the following general formula:

$$R1—N{=}C{=}N—R2$$

wherein R1 and R2 independently consist of a hydrogen atom, aliphatic, saturated or unsaturated hydrocarbons, having from 1 to 10 carbon atoms and/or aromatic hydrocarbons having from 6 to 16 carbon atoms. R1 and R2 independently consist of linear, cyclic or branched alkyl, alkenyl, aryl, aralkyl, aralkenyl groups, optionally substituted with a halogen atom, a primary, secondary or tertiary amino group, an ester group, a sulfate or sulfonate group, or a ketone group. One or both of the R1 and R2 groups may contain a further carbodiimide group, so as to form an oligomeric or polymeric carbodiimide. Preferably, the carbodiimide used in the present invention is soluble or dispersible in water, but aqueous dispersions of water-insoluble carbodiimides may also be used.

The carbodiimide can be selected from the group consisting of ethyl dimethylaminopropyl carbodiimide (EDC-HCl); 1,3-di-p-tolylcarbodiimide 1-(3-dimethylaminopropyl)-3-ethylcarbodiimide; 1,3-diisopropylcarbodiimide; 1,3-dicyclohexylcarbodiimide; 1-cyclohexyl-3-(2-morpholinoethyl)carbodiimide methyl-p-toluenesulfonate; 1-tert-butyl-3-ethylcarbodiimide; 1,3-dicyclohexylcarbodiimide; 1,3-bis(trimethylsilyl) carbodiimide; 1,3-di-tert-butylcarbodiimide; 1-(3-dimethylaminopropyl)-3-ethylcarbodiimide methyldide; and 1-(3-dimethylaminopropyl)-3-ethylcarbodiimide hydrochloride.

Carbodiimides are commercially available under the brand name Ucarlink™ from Union Carbide company (e.g. Ucarlink™ XL-29SE and Ucarlink™ XL-20), under the brand name Carbodilite™ from Nisshinbo Industries, Inc. (for example Carbodilite™ HMV-15CA and Carbodilite™ V02-L2), and with the brand name Nexoll from the company Euro-Chemical (for example Nexoll CDI B/S).

In detail, the material of the reticular structure 2 is biodegradable; the biodegradability of said material is such that the value of the degradation parameter is lower than 20, optionally comprised between 1 and 10, even more optionally comprised between 1, 2 and 5; the degradation parameter is identified and measured as defined in the description.

Figure 7A:
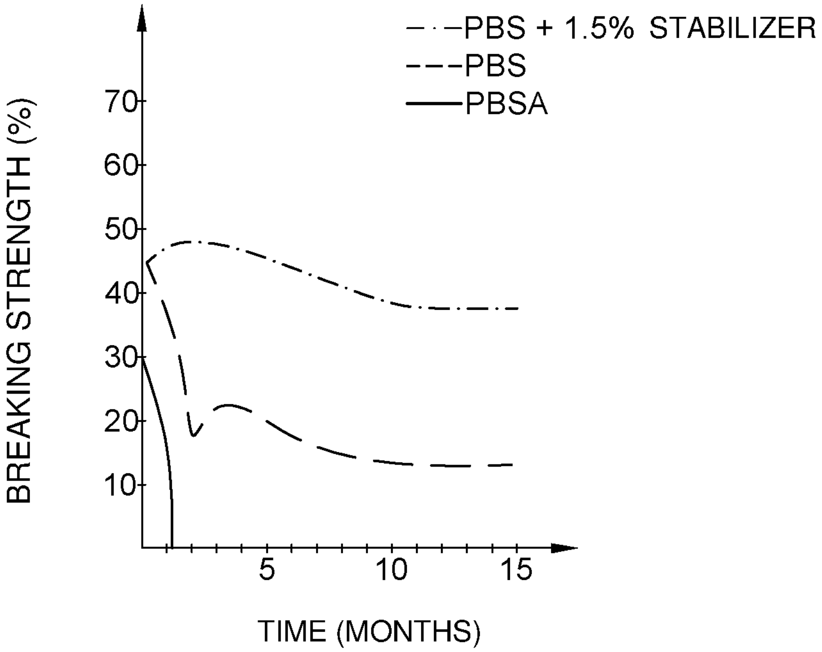
FIGS. 7A and 7B are comparative graphs of test samples.

In fact, the degradation parameter is representative of how the material with which the reticular structure 2 can be made allows it to keep its mechanical features substantially constant, for a predetermined period of use, so that the reticular structure made by means of said material can correctly perform its function (for example of containment and/or protection). FIG. 7A illustrates by way of example the trend of the breaking strength of a test sample made of the material described above for the reticular structure (i.e. polybutylene succinate with stabilizing additive) and according to the dictates of the ISO 527-3 standard; this test sample was also subjected to a biodegradation process according to the ASTM G160-12 (2019) standard for a period of 15 months. As can be seen from FIG. 7A, the variation in the breaking strength over time of the test sample—made of the material of the reticular structure 2 [i.e. polybutylene succinate (identified with the abbreviation PBS) with stabilizing additive] is minimal, lower than 20%, optionally between 1% and 10%. The breaking strength of said test sample seems to stabilize in the period between 10 and 15 months.

As can be seen from FIG. 7A, test samples made according to the dictates of the ISO 527-3 standard, but made of different materials (polybutylene succinate PBS without additives or polybutylene succinate adipate PBSA without additives), when subjected to the same biodegradation process mentioned above, show important variations in the breaking strength—in the order of 100%—already after a duration of the biodegradation process, equal to 2 months.

Figure 7B:
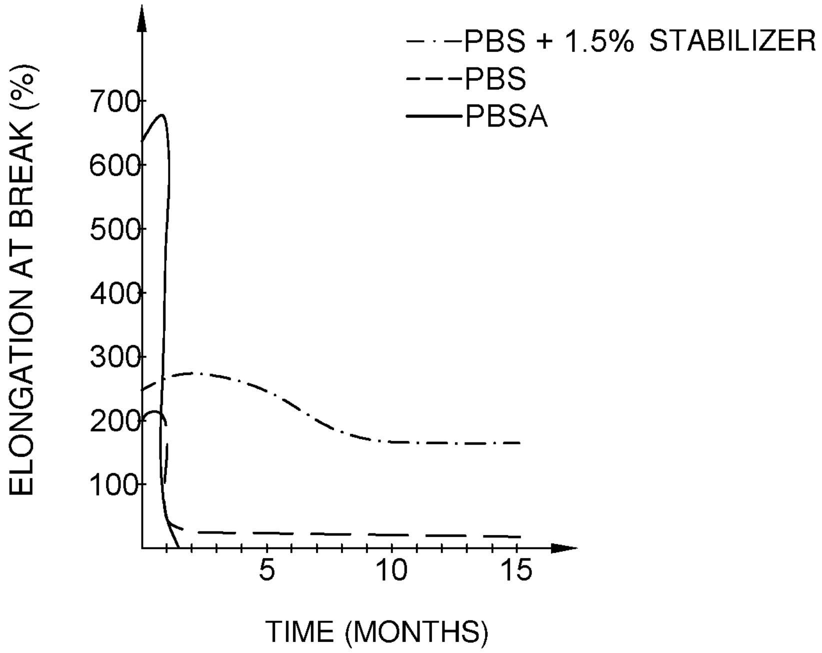

The same results are visible in FIG. 7B, in which the percentage elongation at break of samples made according to the dictates of the ISO 527-3 standard and subjected to the biodegradation process described above are compared. As can be seen, the material (polybutylene succinate+stabilizing additive) of the reticular structure 2 has a degradation parameter variation lower than 20, optionally between comprised 1 and 10, even more optionally between 1.2 and 5; wherein the degradation parameter is defined (as described above) as a ratio $\Delta R_1/AR_2$ between the percentage elongation at break $\Delta R_1$ of the first test sample as measured above and the percentage elongation at break $\Delta R_2$ of the second test sample (measured after said biodegradation of 7 months). In fact, said polymeric composition (polybutylene succinate+stabilizing additive) allows the test sample subjected to the biodegradation process mentioned above to maintain a certain structurality, so that said test sample may have in the long term (for example up to 15 months) excellent mechanical features and in particular low fluctuations in the percentage elongation at break.

In fact, such material (polybutylene succinate+stabilizing additive) is such that a test samples according to the ISO 527-3 standard is subjected to the biodegradation process defined by the ASTM G160-12 (2019) standard for a period longer than 2 months, optionally longer than 7 months, even more optionally comprised between 8 and 15 months, may maintain structural continuity along the entire extension of said test samples. Moreover, said material is such that a test sample according to the ISO 527-3 standard is subjected to the biodegradation process defined by the ASTM G160-12 (2019) standard for a period longer than 20 months, optionally longer than 16 months, does not maintain structural continuity throughout the extension of said test sample. In detail, the test sample, as defined in the ISO 527-3 standard, extends between a first and a second end; this test sample subjected to the biodegradation process defined by the ASTM G160-12 (2019) standard for a period longer than 20 months, optionally longer than 16 months, is configured for defining a separation between said first and second ends. In other words, said test sample subjected to the biodegradation process defined by the ASTM G160-12 (2019) standard for a period longer than 20 months, optionally longer than 16 months, is configured for exhibiting such biodegradation as to define a complete separation of said first and second ends.

Figure 8:
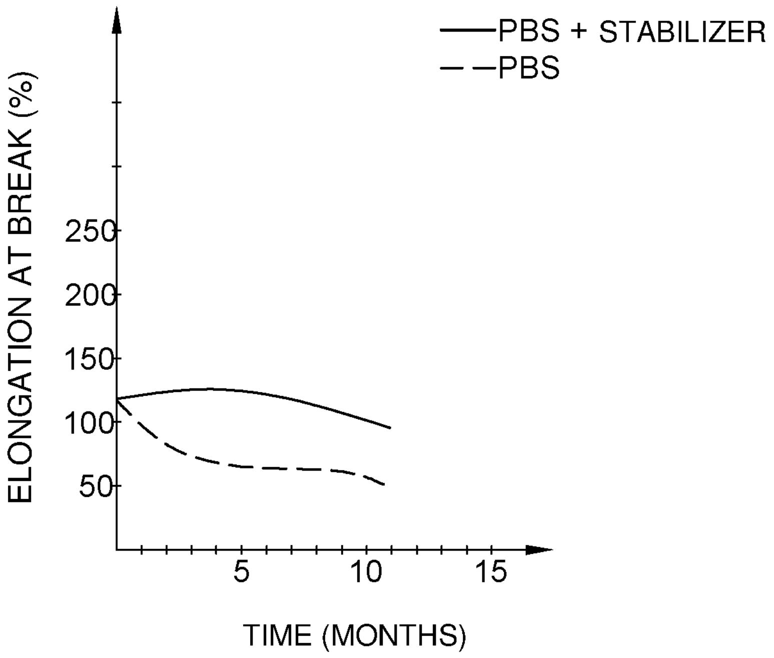
FIG. 8 is a further comparative graph of nets of biodegradable material.

FIG. 8 instead illustrates the trend of the percentage elongation at break of two identical reticular structures.

The trend of the percentage elongation at break of the reticular structure 2 made by means of a material according to the present invention—or made of a material comprising a biodegradable polymeric composition (in particular polybutylene succinate) and at least one stabilizing additive and subjected to a biodegradation process according to the aforementioned standard (ASTM G160-12 (2019) is schematized with a continuous line; as can be seen, the substantially constant trend of the percentage elongation at break of the test sample [made of polybutylene succinate+stabilizing additive) subjected to the biodegradation process according to the aforementioned standard (ASTM G160-12 (2019)] shown in FIG. 7A is reflected in the substantially constant trend of the percentage elongation at break of a reticular structure 2 made of a material comprising a biodegradable polymeric composition (in particular polybutylene succinate) and at least one stabilizing additive. The greater variation over time of the percentage elongation at break of a reticular structure made entirely of polybutylene succinate (without additive) and subjected to the biodegradation process according to the aforementioned standard (ASTM G160-12 (2019)) is also shown.

Manufacturing Process

The present invention also relates to a process for manufacturing a reticular structure 2 according to the above description.

The process involves the realization of the first and second elements 3, 4 by means of an extrusion process (simultaneous extrusion of the first and second elements 3, 4), optionally by means of a pulsating technology. It is not excluded the use of an extrusion head that uses a counter-rotating technology. The extrusion head is fed by means of a solid compound in granular form made by means of a known compounding technology. The solid granular compound is made of a biodegradable material, for example polybutylene succinate (PBS) optionally added with a stabilizing additive, used to make the material of the reticular structure 2.

Figure 6:
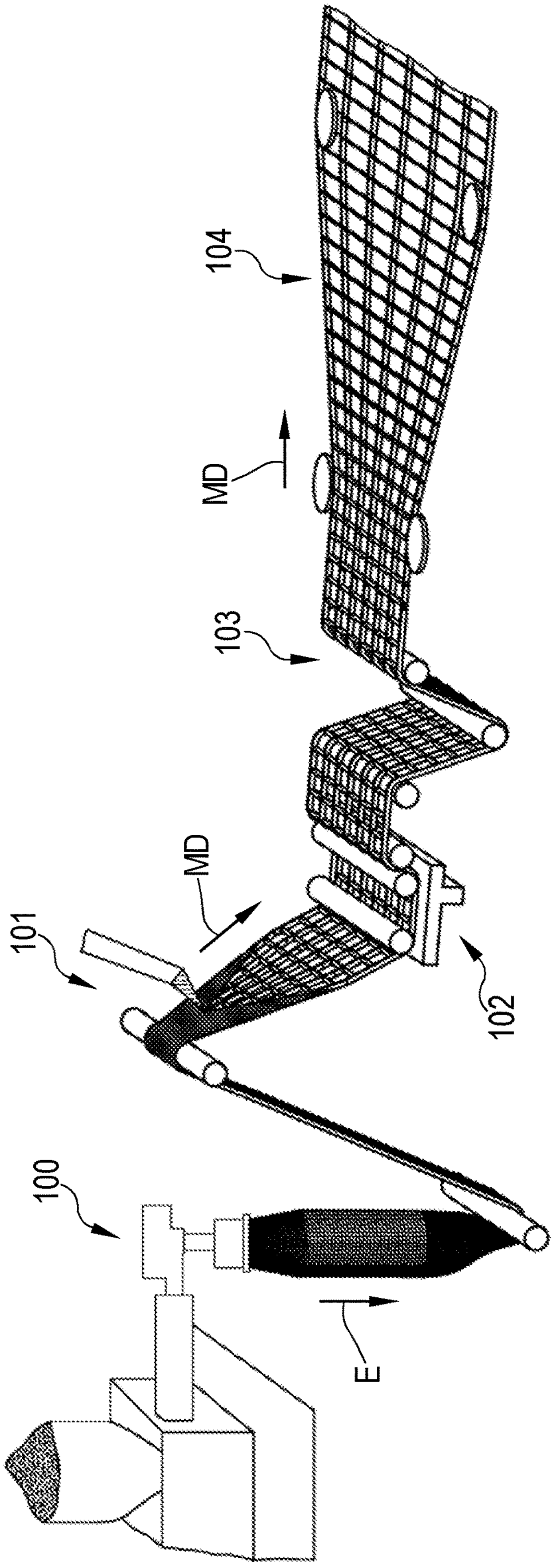
FIG. 6 is a schematic view illustrating a possible manufacturing process of the reticular structure according to the present invention.

The extrusion process, schematically represented in FIG. 6, involves the simultaneous extrusion of first and second precursor bodies by means of an extrusion head 100; the first precursor bodies are longitudinal elements that extend along an extrusion direction E (therefore along an advancement direction MD of the extruded material exiting the head 100) while the second precursor bodies are elements transversal to the first precursor bodies: first and second bodies precursors forming a monolithic reticular integral body. The advancement direction MD is also recognized in the sector as the machine direction, i.e. the direction in which the apparatus for the extrusion and formation of the reticular structure allows the latter advance.

The extrusion step is executed at a temperature comprised between 110° C. and 180° C., optionally comprised between 150° C. and 175° C.; the material exiting the extrusion head is advanced at a speed comprised between 5 meters/minute and 12 meters/minute, optionally comprised between 6 meters/minute and 10 meters/minute. The extrusion can be executed with a cylindrical head suitable for forming a reticular structure having a cylindrical shape.

Figure 5:
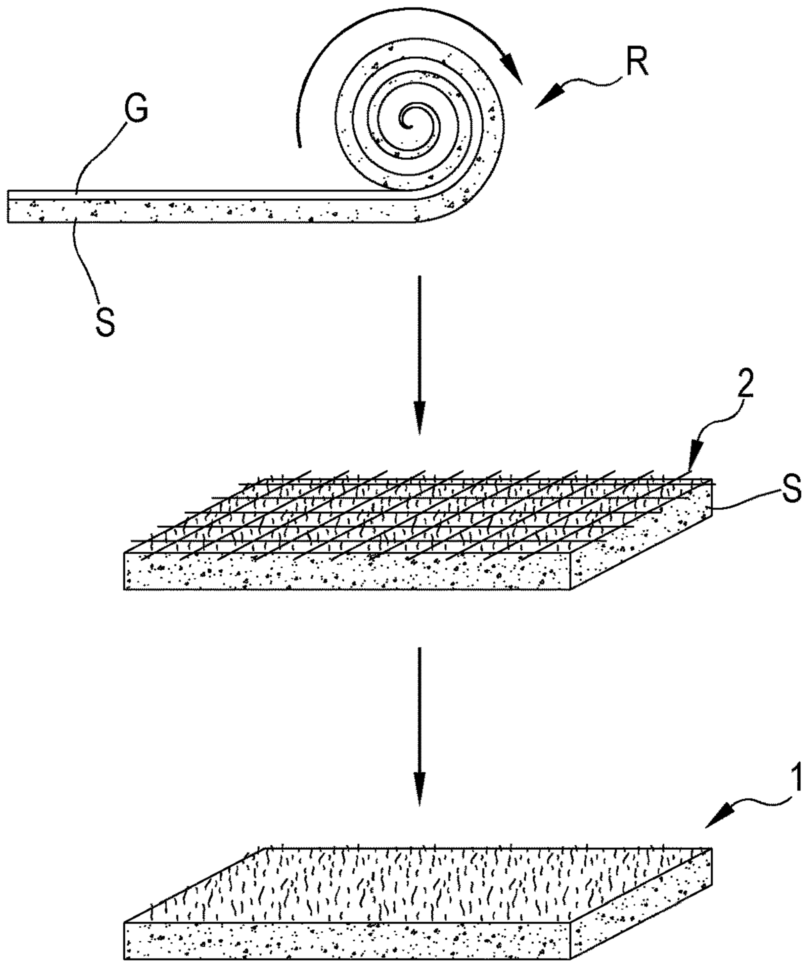
FIG. 5 schematically shows a process of unwinding and placing a grass roll.

Subsequently, such reticular structure exiting the extrusion head is cooled to be cut longitudinally to then be opened and spread flat. FIG. 5 illustrates a cutting station 101 of the cylindrical reticular structure and a subsequent distension station 102 in which the open reticular structure is spread on a single plane. The spread reticular structure can define the reticular structure 2 having first and second unstretched elements. This structure, once spread, is ready to be rolled up in a collection station (not shown). Alternatively, after the formation of the monolithic integral body, the latter can undergo a stretching process.

The reticular structure exiting the extrusion head defines a monolithic semi-finished product with a reticular structure having first and second precursor bodies spaced apart and interconnected to essentially define a semi-finished product in the form of a net. In one embodiment, the semi-finished product is extruded by means of a head which uses a pulsating technology; the first precursor bodies extend along the extrusion direction while the second precursor bodies extend orthogonally to said first precursor bodies to define a square or rectangular mesh semi-finished product.

Subsequently, such monolithic semi-finished product with a reticular structure exiting the extrusion head is cooled to be cut longitudinally, i.e. along the extension direction of the first precursor bodies to then be opened and spread flat. FIG. 6 illustrates a cutting station 101 of the monolithic semi-finished product with a reticular structure and a subsequent stretching station 102 wherein said semi-finished product is spread on a single plane. When lying flat, the first precursor bodies define longitudinal bodies extending along the advancement direction MD while the second precursor bodies define transverse bodies placed orthogonally to the advancement direction.

The semi-finished product, when stretched, can be stretched along the first and/or second precursor bodies.

The process can, for example, carry out the step of stretching only the first precursor bodies or only the second precursor bodies to define a mono-stretched reticular structure 2. Alternatively, the manufacturing process can provide for a double stretching action, i.e. both along the extension of the first precursor bodies and along the extension of the second precursor bodies to define a bi-stretched (or also called bi-oriented) reticular structure.

In the accompanying figures, a process which provides for the stretching of both the first and second precursor bodies has been illustrated, in a non-limiting manner. For example, the process can provide for a first stretching action of the first precursor bodies in a longitudinal stretching station 103 placed immediately downstream of the stretching station. The stretching of the first precursor bodies defining said first stretched elements 3 can be executed by means of the movement of the semi-finished product along the advancement direction at a speed greater than that of extrusion to allow an elongation of the semi-finished product along the machine direction; for example, the stretching speed of the first precursor bodies—defining said first stretched elements 3—is carried out, along the advancement direction MD, at a speed comprised between 23 meters/minute and 27 meters/minute. During the stretching step, the semi-finished product is heated to a temperature comprised between 65° C. and 110° C. In particular, the stretching step of the first precursor bodies is executed, optionally in a water bath, at a temperature comprised between 75° C. and 90° C. Of course, the possibility of stretching the first precursor bodies is not excluded even when the semi-finished product with a reticular structure is in its circular shape or before the cutting step.

The process can also involve for a second stretching action performed on the second precursor bodies in a transversal stretching station 104 placed downstream of the stretching station, in particular immediately downstream of the longitudinal stretching station 103. The stretching of the second precursor bodies for defining said second stretched elements 4 can be performed by means of a pulling step, for example by gripping pliers, of the semi-finished product with a reticular structure according to a direction orthogonal to the advancement direction. The stretching speed of the second precursor bodies—for defining said second stretched elements 4—is executed at a speed comprised between 4 meters/minute and 30 meters/minute, optionally comprised between 8 meters/minute and 20 meters/minute. The step of stretching the second precursor bodies is executed, optionally in a casing inside which there is heated air, at a temperature comprised between 85° C. and 110° C. It is not excluded that the step of stretching the second precursor bodies can be executed before stretching the first precursor bodies. Following the formation of the reticular structure and therefore of the first and second elements 3, 4 (optionally stretched), the reticular structure is subsequently cut transversely to the first elements according to a predetermined length, measured in the direction of the first elements 3 to define said reticular structure 2. The reticular structure 2, before the cutting step, can be wound in a roll in a collection station.

Further manufacturing systems are possible and are evident for those skilled in the art of extrusion, such as starting from a flat extrusion head to make a sheet which will then be subjected to the cold drilling and ironing steps to obtain of the reticular structure 2.

Grass Clod

The present invention also relates to a grass clod 1 comprising a reticular structure 2 as described above.

The grass clod 1 comprises a soil layer S, a predetermined quantity of grass G emerging from one side of the soil layer and at least a reticular structure 2 housed at least partially in the soil layer. The reticular structure 2 is configured, in use, for consolidating at least the soil layer; the soil layer extends in thickness between a first and a second surface, optionally the thickness of the soil layer S is greater than 0.5 cm, optionally it is comprised between 0.65 cm and 2.5 cm; the grass clod has a surface extension greater than 0.25 $m^2$, optionally it is comprised between 0.25 $m^2$ and 1.5 $m^2$.

Process for Making a Grass Clod

The present invention also relates to a process for making a grass clod 1 comprising a reticular structure 2 as described above.

The process comprises a first step of laying the reticular structure 2 on a soil portion. In detail, the reticular structure in roll form is unrolled and then spread over the soil portion. The reticular structure 2 can therefore be arranged above (resting on) the exposed surface of the ground or it can be pressed onto the ground in such a way that at least part of said reticular structure 2 can immerse itself in the ground, remaining in any case in proximity to the exposed surface. Following the laying (spreading) of the reticular structure 2, the process comprises a step of sowing the soil by laying grass seeds. After sowing, the grass follows the normal growth process which can last, for example, depending on the conditions and treatments of the soil, from 6 months to 14 months. During the growth step of the grass, the reticular structure is configured for being incorporated into the soil layer and to the grass for allowing the consolidation of the soil. Following the growth of grass on the soil portion, the process provides for a cutting step in the soil to delimit a grass clod. The grass clod thus cut is then collected. The grass clod thus created is then ready to be laid on a ground for making a turf.

Grass Roll

The present invention also relates to a grass roll R comprising a reticular structure 2 as described above and/or according to any one of the accompanying claims.

The grass roll R is wound around an axis in a spiral pattern (see for example FIGS. 3 and 4) and comprises a soil layer S, a predetermined amount of grass G emerging from one side of the soil layer and at least one reticular structure 2 engaged to the soil layer. The reticular structure 2 is configured, in use, for consolidating at least the soil layer S; the soil layer S extends in thickness between a first and a second surface, optionally the thickness of the soil layer is greater than 0.5 cm, optionally it is comprised between 0.65 cm and 2.5 cm. The grass roll R, completely unwound and arranged on a plane, has a length of between 1 meter and 40 meters; said length being measured along an unwinding direction of the same grass roll R. The roll R has a width equal to or greater than 0.6 meters, optionally comprised between 0.6 meters and 2 meters; said width being measured along the axis around which said grass roll is wound.

Process of Making a Grass Roll

The present invention also relates to a process for making a grass roll comprising a reticular structure 2 as described above and/or according to any one of the accompanying claims.

Figure 3:
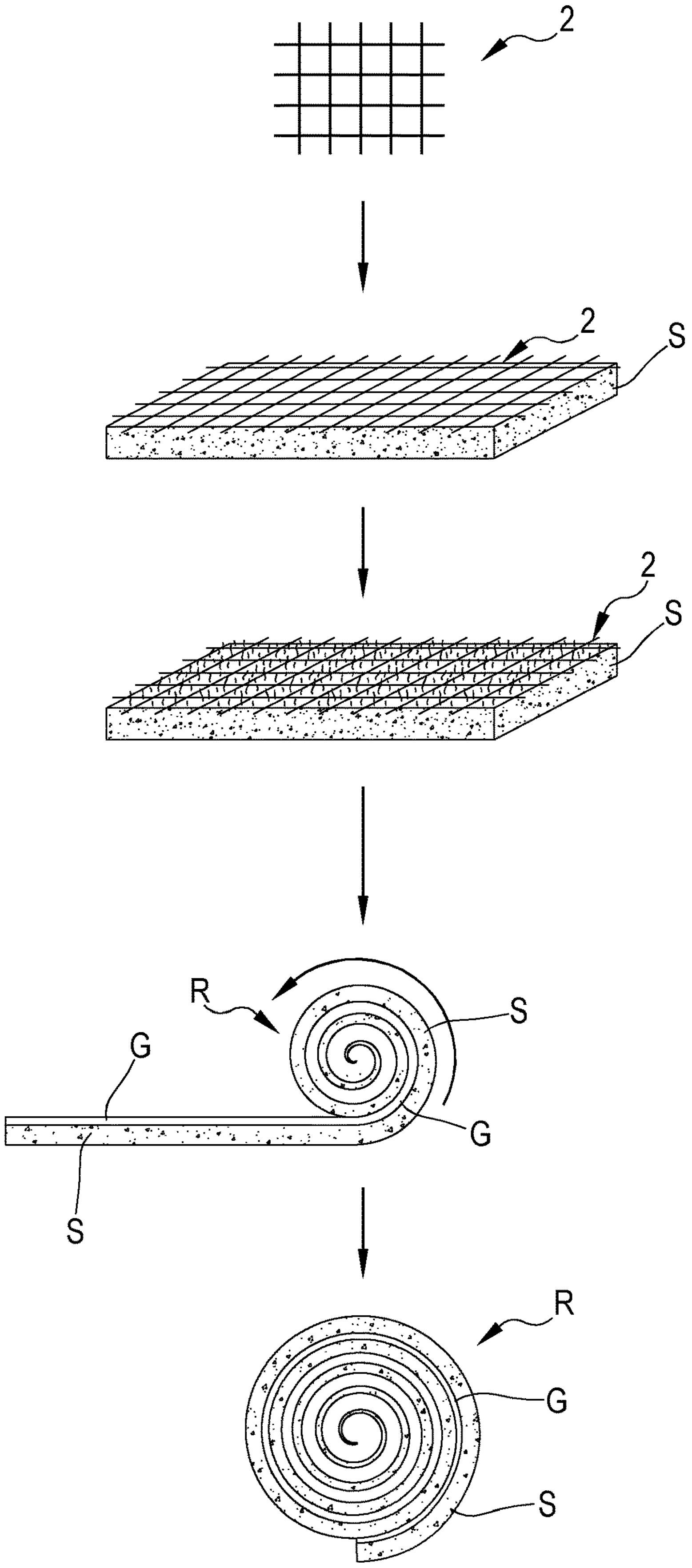
FIG. 3 is a schematic representation of a process for manufacturing a grass roll using a reticular structure according to the present invention.
Figure 4:
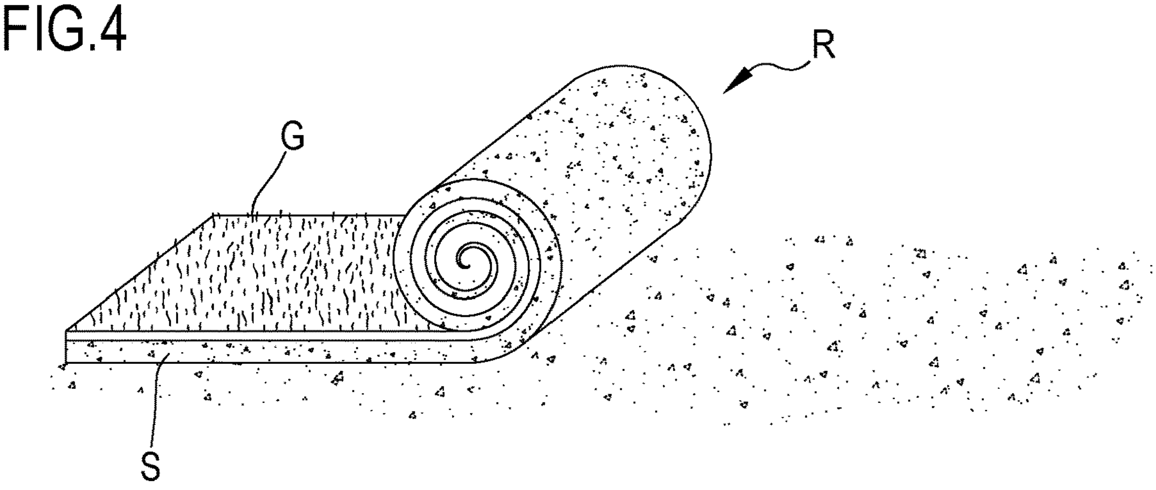
FIG. 4 shows in detail a collecting step of the process for making a grass roll.

The process for making the roll is schematically shown in FIG. 3. This process comprises the same steps of spreading the reticular structure 2 and sowing described above for the grass clod. Following the growth of grass on the soil portion, the process involves a cutting step in the soil to delimit a grass clod along an extension direction. The grass clod thus cut is then placed by means of a rolling action of the clod (see for example FIG. 4) around an axis orthogonal to the extension direction to define said grass roll. The grass roll thus created is then ready to be unwound on a ground for the making a turf. The unrolling (opening) process of the roll is schematically shown in FIG. 5.

Advantages

The present invention entails, compared to the solutions of the prior art, considerable advantages. In particular, the reticular structure 2 made of at least partly biodegradable material is suitable for performing numerous uses. The reticular structure 2 in fact has excellent physical/mechanical properties and reduced construction costs; furthermore, the fact that the reticular structure 2 has the aforementioned features allows producing grass clods and/or grass rolls that are extremely stable and therefore easier to collect and transport. In detail, the reticular structure, by virtue of its material, is suitable for not degrading during the growth period of the grass so as to maintain its mechanical features and therefore consolidate the soil correctly; the reticular structure 2 is also configured for degrading after a predetermined period of time, generally following the growth of the grass and the collection and subsequent installation of the grass clod or roll. In fact, the material used allows the reticular structure 2 to be highly preforming in terms of consolidation of the ground (grass clods or grass rolls) but at the same time to be biodegradable and therefore not negatively impacting the environment. The material used for the reticular structure 2 allows it to degrade in a controlled manner after a predetermined period.

The reticular structure 2, by virtue of the material of the reticular structure, is also processable even by means of the most delicate production processes such as extrusion by means of a pulsating head. It should be noted that often, the extrusion with a pulsating head is preferable to counter-rotating extrusion heads because it allows obtaining a semi-finished product having square or rectangular meshes in which an order of elements (for example the first precursor bodies adapted to define said first elements 3) extends along the extrusion direction E and therefore of advancement of the semi-finished product along the steps of the production process and an order of elements (for example the second precursor bodies suitable for defining said second elements 4) placed orthogonally to said extrusion direction E/advancement of the semi-finished product; the semi-finished product thus constituted is more easily subjected to a stretching action of the material and moreover it is more controllable in the stretching ratios since the first and second precursor bodies are respectively placed substantially parallel and orthogonally to the advancement direction of the semi-finished product.

The invention claimed is:

1. A monolithic reticular structure configured for soil consolidation comprising:

a plurality of first elements distanced from each other and having an elongated conformation according to a first trajectory, and a plurality of second elements distanced from each other and having an elongated conformation according to a second trajectory transversal to the first trajectory, wherein the first elements and the second elements intersect at nodes to form a mesh, wherein the monolithic reticular structure is made of a material comprising a biodegradable polymeric composition which is in a range of 92% to 99.5% by weight of a total weight of the material of the monolithic reticular structure, wherein the material also comprises a stabilizing additive configured to delay degradation over time of the monolithic reticular structure during conditions of use of soil consolidation, wherein the stabilizing additive is in a range of 0.8% to 6% by weight of the total weight of the material of the monolithic reticular structure, and wherein the monolithic reticular structure is configured for soil consolidation.

2. The monolithic reticular structure according to claim 1, wherein the biodegradable polymeric composition is polybutylene succinate.

3. The monolithic reticular structure according to claim 1, wherein the material consists essentially of:

polybutylene succinate constituting substantially 98.5% by weight of the total weight of the material, and the stabilizing additive.

4. The monolithic reticular structure according to claim 1, wherein the stabilizing additive comprises a crosslinking agent.

5. The monolithic reticular structure according to claim 1, wherein the stabilizing additive comprises a crosslinking agent comprising carbodiimide groups.

6. The monolithic reticular structure according to claim 5, wherein the crosslinking agent is at least one of aliphatic or aromatic carbodiimide.

7. The monolithic reticular structure according to claim 1, wherein the first elements are stretched corresponding to a stretching ratio in a range of 2 to 8; the stretching ratio is a ratio between a final length of the first elements after a stretching action thereof, and an initial length of the first elements before the stretching action.

8. The monolithic reticular structure according to claim 1, wherein the second elements are stretched to a stretching ratio in a range of 2 to 5; and the stretching ratio is a ratio between a final length of the second elements after a stretching action thereof and an initial length of the second elements before the stretching action.

9. The monolithic reticular structure according to claim 1, wherein the stabilizing additive comprises at least one of:
- an ultraviolet stabilizing additive, or
- a coloring additive.

10. A grass clod comprising:
- a soil layer,
- grass emerging from one side of the soil layer, and
- a soil containment layer formed by the monolithic reticular structure according to claim 1 on or embedded in the soil layer.

11. The grass clod according to claim 10, wherein the soil layer extends in thickness between a first surface and a second surface, wherein the monolithic reticular structure is entirely embedded in the soil layer between the first surface and the second surface.

12. The grass clod according to claim 11, wherein the monolithic reticular structure extends substantially parallel to at least one of a first surface or a second surface of the soil layer.

13. The grass clod according to claim 10, wherein the biodegradable polymeric composition is polybutylene succinate, and the stabilizing additive comprises a crosslinking agent including carbodiimide groups.

14. The grass clod according to claim 10, wherein the first elements are stretched to a stretching ratio in a range of 2 to 8, and the stretching ratio of the first elements is a ratio between a final length of the first elements after a stretching action thereof and an initial length of the first elements before the stretching action, and
- wherein the second elements are stretched to stretching ratio which is in a range of 2 to 5, and the stretching ratio of the second elements is a ratio between a final length of the second elements after a stretching action thereof and an initial length of the second elements before the stretching action.

15. A grass roll wound around an axis and comprising:
- a soil layer,
- grass emerging from one side of the soil layer, and
- a soil containment layer including the monolithic reticular structure according to claim 1.

16. The grass roll according to claim 15, wherein the biodegradable polymeric composition is polybutylene succinate, and the stabilizing additive comprises a crosslinking agent comprising carbodiimide groups.

17. The grass roll according to claim 15, wherein the first elements are stretched to a stretching ratio is in a range of 2 to 8, and the stretching ratio of the first elements is a ratio between a final length of the first elements after a stretching action thereof and an initial length of the first elements before the stretching action; and
- wherein the second elements are stretched to stretching ratio is in a range of 2 to 5, and the stretching ratio of the second elements is a ratio in a range of a final length of the second elements after a stretching action thereof to an initial length of the second elements before the stretching action.

18. A monolithic reticular structure configured for soil consolidation comprising:
- a plurality of first elements distanced from each other and having an elongated conformation according to a first trajectory, and
- a plurality of second elements distanced from each other and having an elongated conformation according to a second trajectory transversal to the first trajectory,
- wherein the first elements and the second elements intersect at nodes to form a mesh,
- wherein the monolithic reticular structure is made of a material comprising a biodegradable polymeric composition which is at least 90% by weight of a total weight of the material of the monolithic reticular structure, wherein the biodegradable polymeric composition is polybutylene succinate,
- wherein the material comprises a stabilizing additive configured to delay degradation of the monolithic reticular structure over time during soil consolidation by the monolithic reticular structure, wherein the stabilizing additive includes a crosslinking agent comprising carbodiimide groups, and
- wherein the monolithic reticular structure is configured for soil consolidation.

19. The monolithic reticular structure according to claim 18, wherein the biodegradable polymeric composition is in a range of 92% to 99.5% by weight of a total weight of the material of the monolithic reticular structure, and the stabilizing additive is in a range of 0.8% to 6% by weight of the total weight of the material of the monolithic reticular structure.

20. The monolithic reticular structure according to claim 18, wherein the first elements are stretched to a stretching ratio which is in a range of 2 to 8, and the stretching ratio of the first elements is a ratio between a final length of the first elements after a stretching action thereof and an initial length of the first elements before the stretching action; and
- wherein the second elements are stretched to stretching ratio is in a range of 2 to 5, and the stretching ratio of the second elements is a ratio in a range of a final length of the second elements after a stretching action thereof to an initial length of the second elements before the stretching action.

* * * * *